Figure 1:
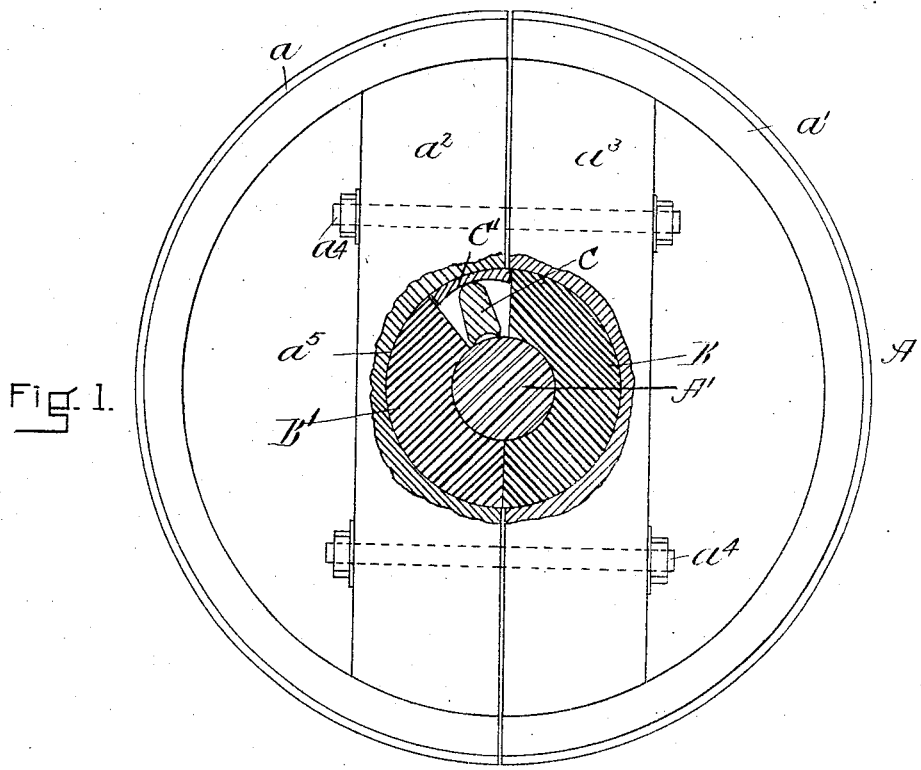

No. 786,039. PATENTED MAR. 28, 1905.
D. G. LANGLANDS.
KEYING DEVICE FOR PULLEYS.
APPLICATION FILED OCT. 8, 1904.

Witnesses
M. V. Foley.
Jm. Dolan.

Inventor
Daniel G. Langlands

Attorneys

No. 786,039. Patented March 28, 1905.

UNITED STATES PATENT OFFICE.

DANIEL G. LANGLANDS, OF WINTHROP, MASSACHUSETTS, ASSIGNOR TO JAMES H. ROBERTS & COMPANY, OF BOSTON, MASSACHUSETTS.

KEYING DEVICE FOR PULLEYS.

SPECIFICATION forming part of Letters Patent No. 786,039, dated March 28, 1905.

Application filed October 8, 1904. Serial No. 227,640.

*To all whom it may concern:*

Be it known that I, DANIEL G. LANGLANDS, a citizen of the United States, and a resident of Winthrop, in the county of Suffolk and State of Massachusetts, have invented a new and useful Improvement in Keying Devices for Pulleys, of which the following is a full, clear, and exact description, reference being had to the accompanying drawings, forming a part of this specification, in explaining its nature.

My invention relates to a keying device for such classes of pulleys as have clamp members for securing the pulley to a shaft.

The device is especially applicable to the split pulley, in connection with a common form of which it is illustrated in the drawings.

Figure 2:
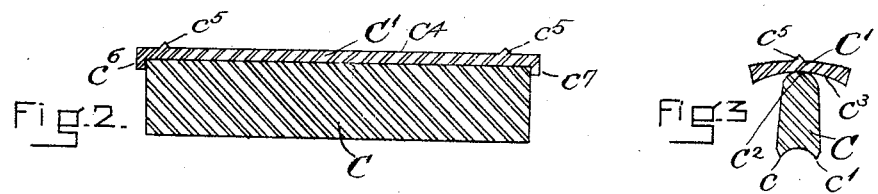
Figure 3:
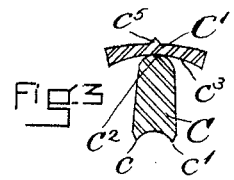
Figure 4:
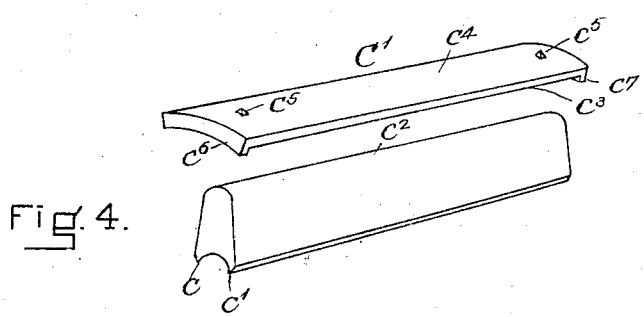

Referring therefore to the drawings, in connection with which the device can best be seen and understood, Figure 1 shows the pulley and improved locking device partly in side elevation and partly in cross-section. Fig. 2 shows the plate and key of the locking device in vertical longitudinal section. Fig. 3 shows a cross-section of the same, and Fig. 4 shows the two parts in perspective.

In the drawings, A represents a split pulley. The face of the pulley comprises the two segmental halves $a$ $a'$, having the cross-ties or clamp members $a^2$ $a^3$ tied together by the draft-bolts $a^4$, by which means the two halves of the pulley are united and the pulley formed. In the center of the members $a^2$ $a^3$ when in conjunction is formed the bore $a^5$ of the pulley. Through this bore $a^5$ there extends a shaft $A'$. The bore of the pulley is made somewhat larger than the shaft extending through it, and inserted between the clamp members and the shaft is a bushing comprising the sections B B'. It is mechanically evident with a pulley thus made that after the two halves of the pulley and sectional bushing have been applied to the shaft then upon tightening the draft-bolts $a^4$ the clamp members will be drawn together, thereby combining the segments forming the face of the pulley, while the clamp members coming together will draw against the sectional bushing and make the same hug against the shaft $A'$, by which means the pulley will become more or less tightly fastened to the same. With respect now to the means for locking the pulley upon the shaft it is noted that the bushing is cut away in part or a section thereof removed, leaving an opening or keyway when the parts are in proper place in the bore of the pulley between the shaft and one of the adjacent clamp members. Into this opening, before the two halves of the pulley have been tightly clamped together, is inserted a key C to bear against the shaft, while between the key and the wall of the adjacent clamp member, bearing against the same and facing the shaft, is inserted a cam or plate $C'$. The key C, it is to be noted, is a bar of metal formed on its side with gripping edges $c$ $c'$, which engage with the shaft, while the back edge $c^2$ of the key is made rounding and is adapted to engage with the inside surface of the cam or plate $C'$, made concave. With respect to the inside concave surface $c^3$ of the plate the concavity is such that when the plate is thus in place between the key and the wall of the clamp member bearing against the same a gradually-lessening radial distance will separate the inside surface of the plate toward either side than at the center thereof, against which the rounding back of the key has its normal bearing, by which means cam-surfaces are formed, with the effect that upon the key turning, which is occasioned by the pulley slipping upon the shaft or the shaft turning independently of the pulley, the rounding back of the key will be moved to bear against one or the other of these cam-surfaces, depending upon the direction the pulley is displaced, resulting in the key becoming wedged in by its bearing against the cam-surface, which so binds the key that its gripping edges will bite more firmly into the shaft, thereby preventing a further displacement of the pulley and holding it locked and secure in place. It is also to be noted that the concavity of the plate or the curve of the cam-surfaces is such that the more the pulley tends to become displaced the tighter will the key be wedged upon the shaft.

With reference to the cam or plate C in further detail it is to be observed that the outside surface $c^4$ of the plate which bears against the wall of the clamp member is provided with projections $c^5$, which are adapted to press into the clamp member for holding the plate, so that it will not slip or become displaced. In width the plate substantially fills the gap made by the cut in the bushing, still not so as to prevent the bushing from being tightened upon the shaft when the two halves of the pulley are clamped together. It is also to be noted that the plate is provided with end flanges $c^6$ $c^7$, so dependent as to prevent an end motion of the key after its insertion, and this especially should the pulley at any time be loose upon the shaft.

The operation of the locking device is as follows: Assuming the two halves of the pulley and sectional bushing to be applied to the shaft and the key and plate inserted into the hole or opening formed in the bushing, with the gripping edges of the key contacting with the shaft and the rounding back edge thereof bearing against the plate at about the center of its inside concave surface, then upon the coming together of the clamp members by the tightening of the draft-bolts $a^4$ the sections of the bushing will not only be made to tighten upon the shaft, as before explained, but as the clamp members come together pressure will also be brought to bear against the plate and key of the locking device. The projections $c^5$ upon the upper surface of the plate will first be pressed into the adjacent wall of the clamp member, then upon a further tightening of the bolts the pressure of the clamp member upon the plate will bind the interposed key tight against the shaft, so that its gripping edges will bite into or engage with it. The key thus engaging with the shaft will not slip, but remain fixed to it, with the effect that if the pulley slips upon the shaft or the shaft turn independently of the pulley in either case the rounding edge of the key will begin to bear against one or the other of the cam-surfaces of the plate, depending upon the direction of displacement of the pulley, and by reason of such bearing the key, as before explained, will become wedged more tightly upon the shaft, preventing any further displacement of the pulley and holding it locked secure in place.

The locking device is extremely simple; also, its making and construction. The shaft and portions surrounding the bore of the pulley are left intact. The device operates to lock or key the pulley upon the shaft by tightening the same bolts and clamp members which secure the pulley thereto. By its use the pulley may be fastened to the shaft at any point and its position changed or the pulley removed simply by loosening or unscrewing the pulley-bolts. Another important advantage resides in the fact that the same relation between pulley and shaft is maintained all along the bore of the pulley, for the key extends entirely through it, so that however tight the pulley may be locked upon the shaft it will still fit evenly, and accordingly will run true.

Having thus fully described my invention, I claim and desire to secure by Letters Patent of the United States—

1. In a keying device for pulleys, the combination with a shaft and a pulley loosely fitting thereon of a cam inside said pulley facing said shaft and movable with said pulley, and a key between said cam and shaft, one edge of which key is adapted to engage said shaft and the other edge thereof to engage with the inside surface of said cam upon said pulley or shaft turning independently of one another.

2. In a keying device for pulleys, the combination with a shaft and a pulley loosely fitting thereon of a sectional bushing inside the bore of said pulley, said bushing being cut away in part leaving a keyway or opening through the bore of the pulley alongside the shaft, a cam inside said pulley, occupying a portion of the opening therein and facing said shaft, and a key between said cam and shaft, one edge of said key being adapted to engage said shaft and the other edge thereof to engage with the inside surface of said cam upon said pulley or shaft turning independently of one another.

3. In a keying device for pulleys, the combination with a pulley and a shaft, said pulley having clamp members for securing it to the shaft, of a sectional bushing interposed between said clamp members and said shaft, said bushing being cut away in part leaving an opening through the bore of the pulley and between one of its clamp members and the shaft, a key inside said opening, said key being adapted to engage with the shaft, a plate likewise within said opening interposed between the back edge of said key and the adjacent wall of the clamp member, said plate being adapted on the outside to bear against said portion of the wall of the clamp member and on the inside concaved to form a cam-surface against which the back edge of the key may have bearing, substantially as described.

4. In a keying device for pulleys, the combination with a pulley and a shaft, said pulley having clamp members for securing it to the shaft, of a sectional bushing interposed between said clamp members and said shaft, said bushing being cut away in part leaving an opening through the bore of the pulley and between one of its clamp members and the shaft, a key inside said opening, said key being provided with gripping edges, which engage with the shaft and having a rounding back edge, a plate likewise within said opening interposed between the rounding back edge of said key and the adjacent wall of the clamp member, said plate on the outside being adapted to bear against said portion of the wall of the clamp member without slipping and on the inside made concaved to form opposite cam-surfaces against either one of which the rounding back edge of the key may have bearing, substantially as described.

5. In a keying device for pulleys, the combination with a pulley and a shaft, said pulley having clamp members for securing it to the shaft, of a sectional bushing interposed between said clamp members and said shaft, said bushing being cut away in part leaving an opening through the bore of the pulley and between one of its clamp members and the shaft, and a key inside said opening, said key being provided with gripping edges on its one side which engage with the shaft and having a rounding back edge, a plate likewise within said opening interposed between the rounding back edge of said key and the adjacent wall of the clamp member, said plate on the outside being adapted to bear against said portion of the wall of the clamp member and provided with projections which engage with the same, which plate on the ends is formed with depending flanges preventing lateral displacement of said key and on the inside made concave to form opposite cam-surfaces against either one of which the rounding back edge of the key may have bearing, substantially as described.

6. In a keying device for pulleys, the combination with a shaft and a pulley loosely fitting thereon, of cam and key members inside said pulley and between it and said shaft, one of which members is adapted to engage with said pulley and the other with said shaft and which are so coördinated that said key member will engage with the cam-surface of said cam when said pulley and shaft turn independently of one another, substantially as and for the purposes set forth.

7. In a keying device for pulleys, the combination with a shaft and a pulley loosely fitting thereon, of a sectional bushing inside the bore of said pulley, said bushing being cut away in part leaving a keyway or opening through the bore of the pulley alongside the shaft, cam and key members inside said pulley, occupying a portion of the opening therein, one of which members is adapted to engage with said pulley and the other with said shaft, and which are so coördinated that said key member will engage with the cam-surface of said cam when said pulley and shaft turn independently of one another.

DANIEL G. LANGLANDS.

In presence of—
M. V. FOLEY,
JOHN E. R. HAYES.